United States Patent
Bayer et al.

[19]

[11] Patent Number: 6,031,606
[45] Date of Patent: Feb. 29, 2000

[54] PROCESS AND DEVICE FOR RAPID DETECTION OF THE POSITION OF A TARGET MARKING

[75] Inventors: Gerhard Bayer, Lindau, Germany; Juerg Hinderling, Marbach, Switzerland; Helmut Ghesla, Hard, Austria

[73] Assignee: Leica Geosystems AG, Heerbrugg, Switzerland

[21] Appl. No.: 09/011,601

[22] PCT Filed: Jul. 26, 1996

[86] PCT No.: PCT/EP96/03308

§ 371 Date: Feb. 3, 1998

§ 102(e) Date: Feb. 3, 1998

[87] PCT Pub. No.: WO97/06409

PCT Pub. Date: Feb. 20, 1997

[30] Foreign Application Priority Data

Aug. 3, 1995 [DE] Germany ............... 195 28 465.8

[51] Int. Cl.[7] .................. G01B 11/26; G01C 3/08; G01C 21/02; H04N 5/225
[52] U.S. Cl. .................. 356/141.5; 356/4.01; 356/141.1; 356/139.04; 348/172; 250/203.2
[58] Field of Search ........ 348/172; 356/139.04–139.08, 356/4.01, 5.15, 141.1–141.5; 250/203.17, 203.3

[56] References Cited

U.S. PATENT DOCUMENTS

| | | | |
|---|---|---|---|
| 4,499,597 | 2/1985 | Alves | 382/41 |
| 4,715,714 | 12/1987 | Gaechter et al. | 356/375 |
| 5,644,386 | 7/1997 | Jenkins et al. | 356/4.01 |
| 5,825,033 | 10/1998 | Barrett et al. | 250/370.1 |

FOREIGN PATENT DOCUMENTS 34 24 806  8/1985  Germany .

OTHER PUBLICATIONS

Huep et al., "Theodolite Systems For Industrial and Geodetic Measurements", *Technische Rundschau*, No. 39, 1988, pp. 3–7 and 14–19.

Huep et al., "Theodolite Sensors For Industrial Surveying", *Opticus*, No. 1/94, pp. 8–9.

*Primary Examiner*—Stephen C. Buczinski
*Attorney, Agent, or Firm*—Foley & Lardner

[57] ABSTRACT

The invention relates to a process and device for the rapid detection of the position of a target marking. The target marking is picked-up by imaging optics and a local optoelectronic detector of a theodolite or tachymeter. Electric signals from the detector are rapidly evaluated in a preprocessing unit by formation of sum functions for determining coordinates of the target marking in such a way that the target marking is immediately automatically detected in coarse targeting and its further movement can be followed automatically. Its track data can simultaneously be recorded.

15 Claims, 4 Drawing Sheets

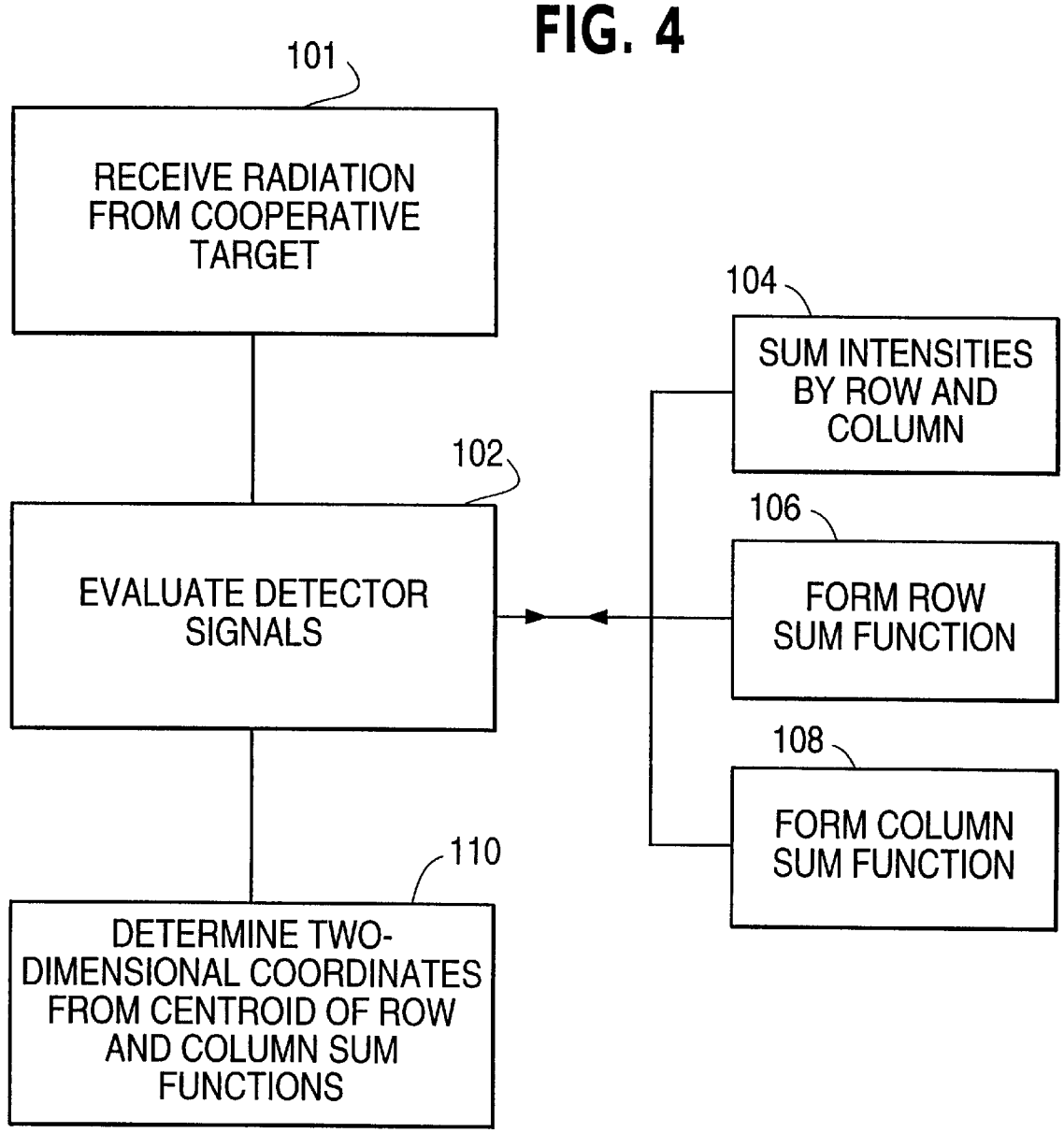

PROCESS AND DEVICE FOR RAPID DETECTION OF THE POSITION OF A TARGET MARKING

BACKGROUND OF THE INVENTION

The invention relates to a method and a device for rapidly detecting the position of a target with the aid of a theodolite having a spatially resolving opto-electronic detector having pixels arranged in the form of a matrix, it being the case that a) the target emits or reflects radiation, b) the radiation coming from the target is received by the imaging optical system and the detector of the theodolite, and c) the detector signals are evaluated.

Such methods and devices are known from the journal "Technische Rundschau" No. 39,1988, pages 14–18, "Theodolitsysteme für industrielle und geodätische Messungen", ("Theodolite systems for industrial and geodetic measurements"), W. Huep, O. Katowski and in the journal "Opticus" No. 1/94, pages 8–9 of the company Leica AG, "Theodolite-Sensoren fürdie industrielle Vermessung" ("Theodolite sensors for industrial surveying").

These publications describe the use of such methods and devices in geodetic surveying, in building surveying and in industrial measurement technology. The general aim is to determine the three-dimensional coordinates of points in space. Targets, for example surface-reflecting spheres, reflecting foils or radiation-emitting targets are positioned at these points and sighted using a theodolite telescope. Triangulation or the polar method are customary in the case of three-dimensional determination of coordinates. In triangulation, two theodolites at a known spacing from one another are aimed at the targets and determine the horizontal and vertical angles with reference to their base line. The polar method employs a tachymeter which comprises a theodolite having an integrated distance meter. The three-dimensional coordinates of the target are likewise calculated from the determination of angle and distance.

In addition to determining and recording coordinates, it is also possible conversely to lay off coordinates on site which are recorded in a plan or can be taken from a map. For example, in road building the route is laid off by means of theodolites or a tachymeter and a rod provided with a target. As operators, this requires at least two people who communicate by hand signals or by radio. On the one hand, the coordinates prescribed according to the plan are set at the surveying instrument, while, on the other hand, the rod with the target is moved until the target has reached the desired coordinates.

It is possible to regard as quasi-continuous laying off applications in which road-driving machines are to keep to a specific path in road building or else in tunneling or mining. These machines, to which a target is attached, are controlled with the aid of a theodolite. In this case, deviations from the desired direction when the machines are being driven forward are detected on the basis of deviating horizontal or vertical angles.

In modern surveying instruments, the visual observation of the target via the theodolite telescope is supported by electronic detection of the target. Use is made of video cameras or of spatially resolving opto-electronic detectors such as, for example, two-dimensional CCD arrays, which are integrated in the imaging optical system of the theodolite. In addition to the literature quoted above, such a system is also described in DE 34 24 806 C2. Image processing is used firstly to determine the coordinates of the target image in the coordinate system of the spatially resolving detector. These are employed to calculate on the basis of a calibration the layer angles of angles from which, in turn, the three-dimensional coordinates of the target in space are calculated in the normal way by means of triangulation or the polar method.

Substantial time is expended on processing because of the large data volumes of image information and is a disadvantage in image processing. Each pixel of a CCD array supplies an intensity value which is transmitted into a computer, usually a PC. Since the number of pixels is of the order of magnitude of 1 million in many CCD arrays, it is a problem if the CCD array is to be read out very often per second and thus many images are to be transmitted per second into the computer for evaluation and to be evaluated at the same time. However, this is precisely what is required for automatic detection of a target or for tracking it automatically. Such image processing for aims of this sort cannot be done in time even using the fast microprocessors currently available.

It is therefore the object of the invention to specify a method and a device so as automatically to detect a target in a short time with little outlay, to determine its coordinates, to track its movement and to record the path data.

The object is achieved by virtue of the fact that the detector signals are fed to a preprocessing unit and that in the preprocessing unit the radiation intensities detected by the pixels of the detector are summed by row and column, in that a row sum function is formed from the sums of the rows and a column sum function is formed from the sums of the columns, and in that the two-dimensional image coordinates of the target in the coordinate system of the detector are determined from the determination of the centroid of the row sum function and column sum function. Furthermore, the object is achieved by the Device described herein. Advantageous embodiments of the invention are also described.

Cooperative targets are used for the invention. Cooperative targets are either fitted with radiating sources which emit light, preferably in the infrared or visible wavelength region, or use is made of reflecting targets which are illuminated by a radiating source. This can be integrated in the theodolite and likewise emit in the infrared or visible wavelength region.

FIG. 4 shows a flowchart of a method for detecting the position of a cooperative target and is described in detail below.

The light emitted or reflected by the target is received by the imaging optical system of the theodolite and projected onto a spatially sensitive optoelectronic detector (step 101). The imaging consists of a light patch having a specific intensity distribution. The latter is detected in a spatially resolved fashion by the light-sensitive structures of the detector. In CCD arrays, the light-sensitive structures are arranged as pixels in the form of a matrix, that is to say in the fashion of rows and columns. The electric signals read out from the detector (step 102) correspond to the intensity distribution of the light patch. The electric signals are read into a pre-processing unit connected to the detector.

According to the invention, the pixel image of the target is separated into two sum functions by means of an appropriately designed hardware in the pre-processing unit. The intensity values of all the pixels of a row are firstly added up for this purpose (step 104). They form a sum value belonging to this row. The sum values of all the rows produce a row sum function as a function of the row number (step 106). Using known mathematical methods, the centroid of the row sum function is determined, and thus supplies a coordinate value in the coordinate system of the detector. The intensity values of the pixels of each column are added up in a similar way (step 104). The centroid, and thus the second coordinate in the coordinate system of the detector are likewise calculated from the column sum function thus produced (step 108). As a result, the two-dimensional image coordinates of the target are determined on the detector (step 110).

The two-dimensional image coordinates of the target are converted into a horizontal and a vertical angle on the basis of calibration values. The angles relate to a sighting axis which, for example, can be the optical axis of the imaging optical system of the theodolite. The sighting axis itself is given in a defined global coordinate system.

The evaluation according to the invention of the target image signifies a drastic reduction in data. Instead of many pixel values, only the sum functions or, if appropriate, only the coordinates of the target image remain to be transmitted into an external arithmetic unit such as, for example a PC. Lengthy evaluation of all the pixels in the PC is eliminated. Of course, the data can also be further processed in an internal arithmetic unit, which is directly coupled to the preprocessing unit.

The substantial gain in time in detecting a target can, on the one hand, be used to the effect that the target need be sighted only coarsely. The target is detected automatically and its coordinates or angular coordinates are determined automatically. They can, for example, be represented on a display. The data can be further processed or stored by the arithmetic unit. The coarse sighting of the target is possible via the theodolite's telescope or via a peep-sight. In the simplest case, it is even sufficient to sight the target via a rear sight notch and front sight, which can be provided as markings on the theodolite. The telescope eyepiece can thereby be eliminated.

A search run can be started if, during coarse sighting, the target is not immediately located in the detection range of the imaging optical system. This presupposes that the vertical and tilt axes of the theodolite are motorized. The theodolite is moved about these axes by means of a search algorithm, until the target is acquired by the imaging optical system and detected by the detector. The search operation and the subsequent coordinate measurement are carried out completely automatically.

It has emerged from a large number of tests that the spatial resolution in the determination of the coordinates of the target in accordance with the invention is surprisingly good and satisfies the requirements in most applications. If, nevertheless, a higher measuring accuracy is required, this can be achieved by longer integration times, that is to say exposure times of the detector, by averaging over a plurality of images, or by refined calibration or image analysis for the purpose of reducing errors. The increased measuring accuracy makes demands on the measuring time. It is therefore provided that the detector is optionally read out synchronously with the video clock or with a frequency matched to the respective application.

It has emerged, furthermore, that it is also possible for undesired stray reflections to be detected and eliminated from the characteristic of the row and column sum functions. Stray reflections come about owing to reflections of the target radiation or illumination radiation on surfaces such as, for example, on water surfaces. Reflections falling into the imaging optical system at different angles lead to changes in the characteristic of the sum functions, which can therefore be detected and corrected.

Likewise, blooming of the detector can be determined from the characteristic of the sum functions. Better suited exposure parameters can be calculated therefrom and automatically set.

It has also emerged that a target imaged unsharply on the detector can be detected just as reliably and precisely as a sharply imaged target. Thus, a cost effective imaging optical system with a suitable permanently set focus is sufficient.

In addition to the automatic detection of a target, the invention also makes it possible to track the target automatically when the latter is, for example, moved from one lay off point or measuring point to the next. In this case, operating the entire system requires only one person, who carries the target to the points to be laid off or measured and positions it there. The theodolite automatically tracks the moving target. For this purpose, the detector of the theodolite detects the target image continuously. The read-out frequency of the detector is set accordingly. The detector signals are evaluated at least just as quickly in the preprocessing unit, and the coordinates of the target image are determined. In the case of varying coordinates of the target image on the detector, it is possible given the presence of vertical-axis and tilt-axis motors of the theodolite for these to be driven in such a way that the theodolite automatically tracks the target. The target image thereby always remains on the light-sensitive active surface of the detector.

If obstacles occur during tracking of the target which interrupt the optical contact of the theodolite with the target, a suitable search algorithm can be used to redetect the target when it reemerges beyond the obstacles. Clearly, the quick detection and determination of coordinates of targets according to the invention is indispensable for the described tracking of targets.

If, in addition, a distance meter, which can be integrated in the theodolite, is used to measure the distances to a moving target, the path of the target is described from the continuous detection of the three-dimensional coordinates of the target. The path data can be stored electronically or recorded permanently on a storage medium.

BRIEF DESCRIPTION OF THE DRAWINGS

Exemplary embodiments are represented diagrammatically in the drawing, and are explained with the aid of FIGS. 1–3, in which:

FIG. 4 shows a flowchart of a method of detecting the position of a cooperative target according to one embodiment of the present invention.

DETAILED DESCRIPTION OF EXEMPLARY EMBODIMENTS

Figure 1:
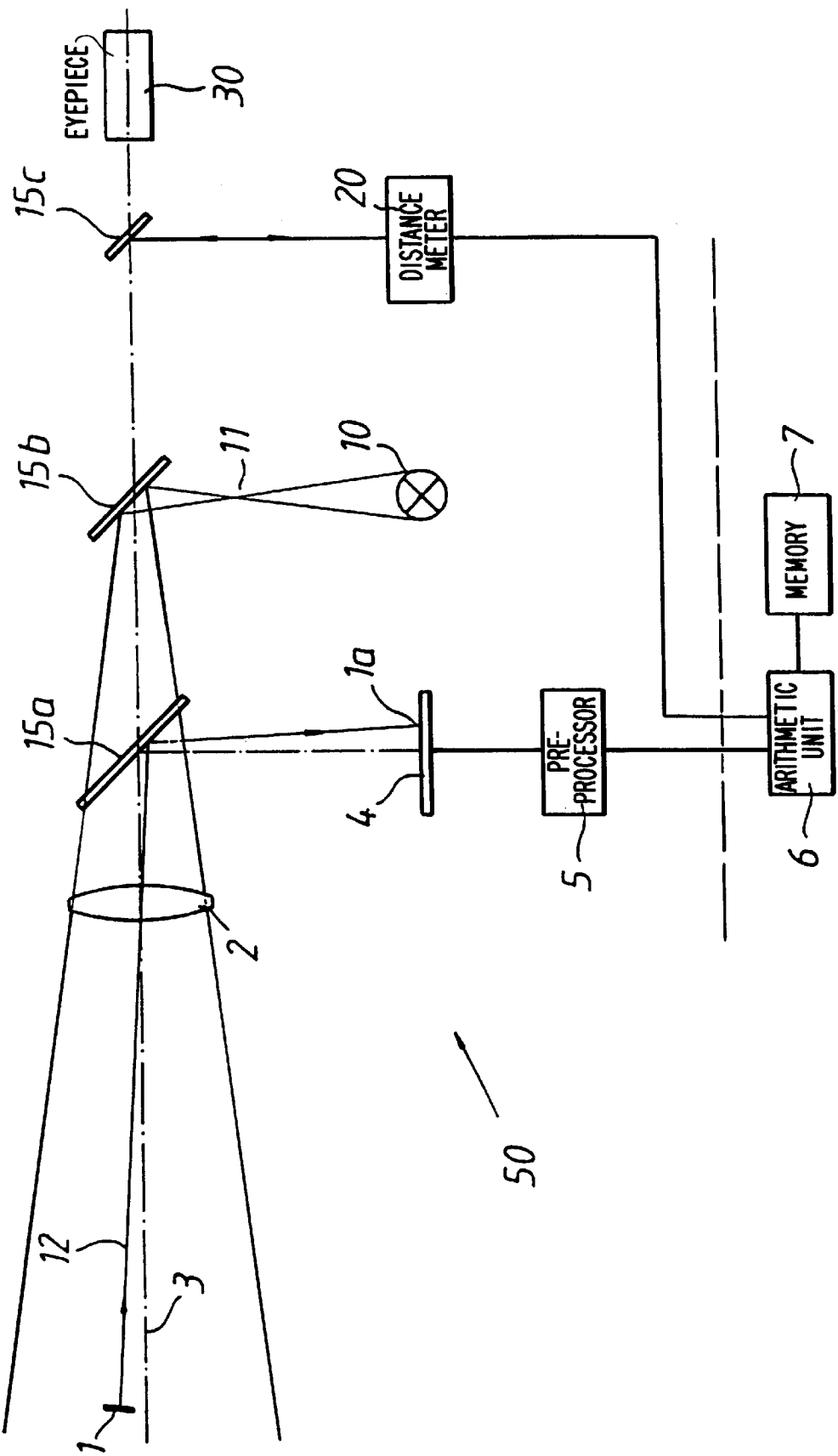
FIG. 1 shows diagrammatically an arrangement of a theodolite and reflecting target.

The design of a theodolite 50 and a reflecting target 1 is represented diagrammatically in FIG. 1. A radiating source 10 is integrated in the theodolite 50. Its radiation 11 leads via a beam splitter 15b and a beam splitter 15a through an imaging optical system 2. In this arrangement, the radiation 11 is aligned coaxially with the imaging optical system 2. It can just as well also extend biaxially relative to the imaging optical system 2. Some of the radiation falls onto the target 1 and is reflected by it. The reflected radiation 12 is received by the imaging optical system 2 and imaged via the beam splitter 15a on a spatially resolving opto-electronic detector 4. It is also possible for mirrors of suitable diameter to be used in a known way instead of the beam splitters 15a, 15b or 15c.

In general, the target 1 is not located on the optical axis 3 of the imaging optical system 2. Consequently, the radiation 12 falling into the imaging optical system 2 forms a horizontal and a vertical angle with the optical axis 3. The result of this is a corresponding position of the target image 1a on the detector 4. It will be explained further below in the description relating to FIG. 3 how a target image 1a can look. It will also be described there how the electric signals of the detector 4 are evaluated in a preprocessing unit 5.

The data supplied by the preprocessing unit 5 can be transmitted for further evaluation into an external arithmetic unit 6. The arithmetic unit 6 can be a PC which receives the data by means of an interface for data transmission. It is also possible to integrate in the theodolite 50 an arithmetic unit 5a in accordance with FIG. 2 which directly further processes the data supplied by the preprocessing unit 5.

Figure 2:
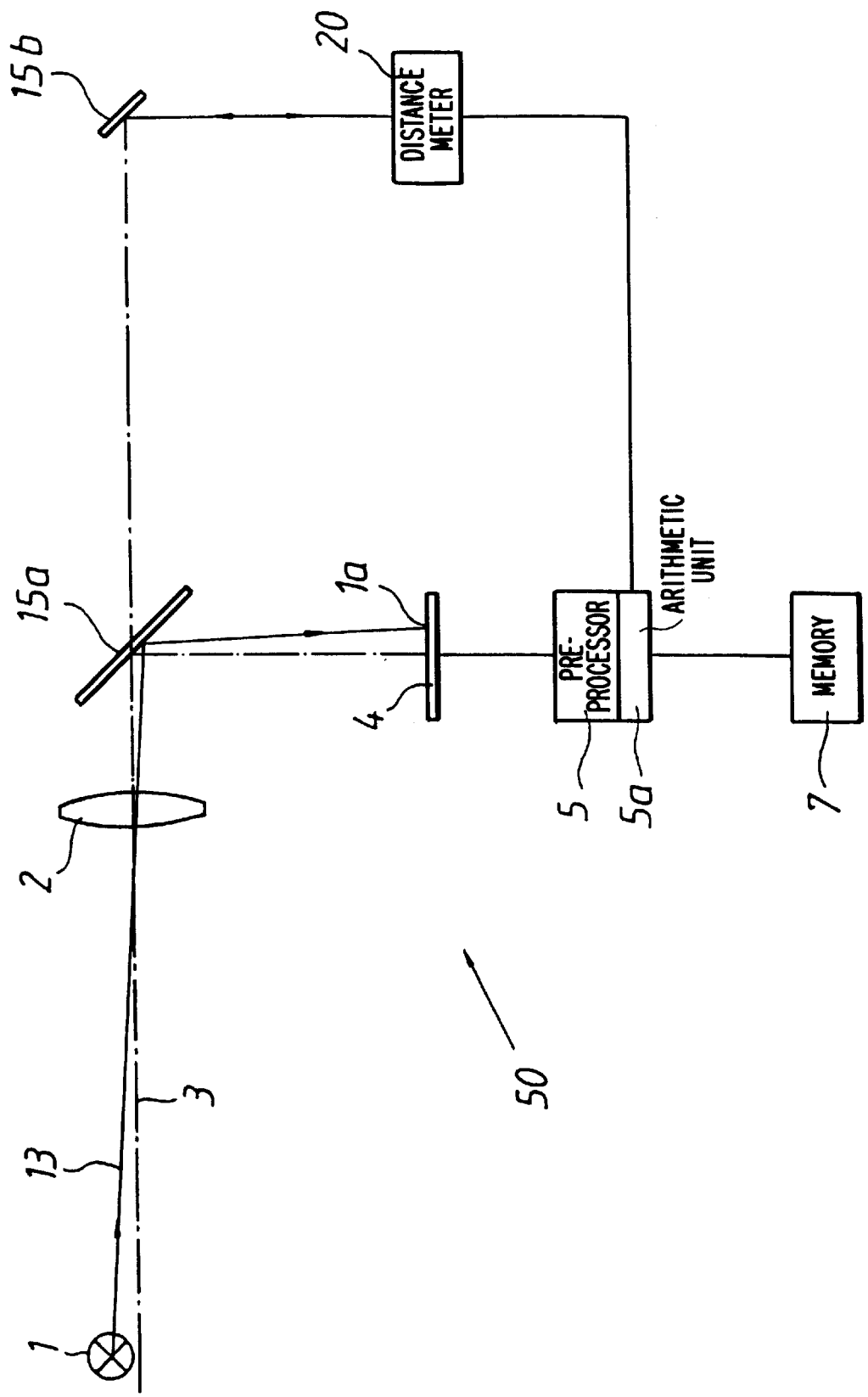
FIG. 2 shows diagrammatically an arrangement of a theodolite and a target emitting radiation.

Shown in FIG. 1 and FIG. 2 is an optical distance meter 20 which can optionally be built in, and which extends the theodolite 50 to form a tachymeter. In the case of a built-in distance meter 20, the radiation thereof is led via a beam splitter 15c and via the beam splitters 15b and 15a through the imaging optical system 2 to the target 1, reflected there and guided back again in the reverse direction. The measured value of the distance which is determined can likewise be transmitted to the external arithmetic unit 6 or to the arithmetic unit 5a. The distance and the angle coordinates of the target 1 determine the three-dimensional coordinates of the latter in space. These can be stored in the memory 7. In the case of a moving target 1, the path data of the target 1, that is to say path coordinates and path velocities, can thus be recorded from the continuous measurement of coordinates.

It goes without saying that the sequence of the arrangement of detector 4, radiating source 10 and distance meter 20 can also be switched.

In the case of theodolites to be operated manually, in which no detector 4 is integrated, the target 1 is sighted using the cross wires of the theodolite's telescope, and the angle coordinates are read off on divided circles. In electronic theodolites 50, a telescope eyepiece 30, which forms the theodolite's telescope together with the imaging optical system 2, can further serve for first time alignment of the theodolite 50. Since, however, owing to the automatic detection of the target 1 according to the invention, a coarse alignment of the theodolite 50 with the target 1 is sufficient, it is also possible to eliminate the telescope eyepiece 30.

The target image 1a can be sharply imaged by a conventional focusing device using the imaging optical system 2 in accordance with FIG. 1 or FIG. 2. Since, however, the detection of the target 1 according to the invention also functions given a suitable permanently set focus without substantial power losses, the conventional focusing device becomes superfluous. It can likewise be eliminated.

The representation in FIG. 2 differs from that in FIG. 1 chiefly in that a radiation-emitting target 1 is represented. The emitted radiation 13 is imaged on the detector 4 by means of the imaging optical system 2. The arithmetic unit 5a is coupled directly to the pre-processing unit 5 and is an integral component of the theodolite 50.

Figure 3:
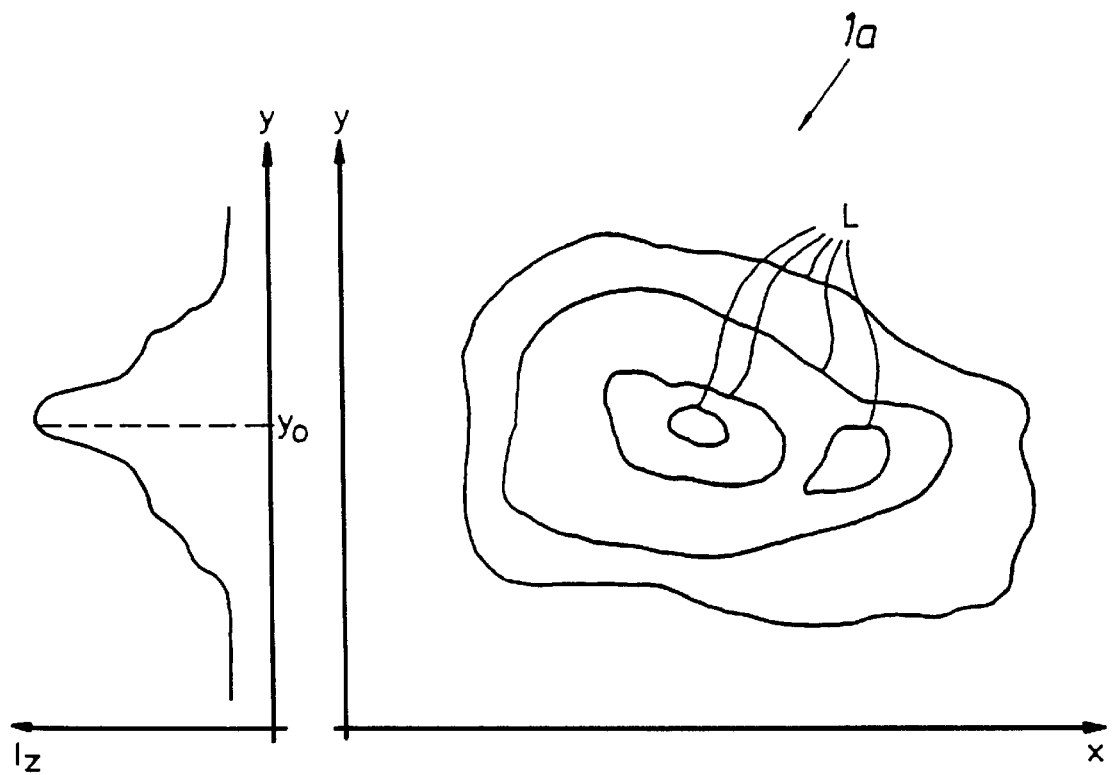
FIG. 3 shows diagrammatically a target image with associated row sum function and column sum function.

An image 1a of the target 1 is represented in FIG. 3 in the coordinate system x,y of the detector 4. Each of the closed lines L respectively signifies a constant intensity. The summing of the intensity values of all the detector pixels of a row, that is to say in the case of a fixed y-value, produces a row sum value. The representation of the row sum values of all the rows as a function of y leads to the row sum function $I_z(y)$ own in FIG. 3. The column sum function $I_s(x)$ is produced in a similar way. Known methods of determining centroids of the sum functions are used to calculate the coordinates $x_0, y_0$ of the target image 1a. Using this method running in the preprocessing it 5, by contrast with conventional image processing, detection of the target 1 becomes so quick that the target is detected automatically in a time which is virtually negligible in practice. It is only thereby that becomes possible to track the movement of the target automatically by means of the theodolite 50.

What is claimed is:

1. A method for rapidly detecting the position of a cooperative target with the aid of a theodolite having a spatially resolving optoelectronic detector having pixels arranged in the form of a matrix, wherein the cooperative target emits or reflects radiation, comprising:

receiving the radiation coming from the cooperative target with an imaging optical system and the detector of the theodolite; and evaluating the detector signals wherein said evaluating includes sending the detector signals to a preprocessing unit, and summing by row and column the radiation intensities detected by the pixels of the detector, such that a row sum function $I_z(y)$ is formed from the sums of the rows and a column sum function $I_s(x)$ is formed from the sums of the columns, wherein two-dimensional image coordinates $(x_0, y_0)$ of the target in the coordinate system x, y of the detector are determined from the determination of the centroid of the row sum function and column sum function.

2. A method according to claim 1, further comprising converting the two-dimensional image coordinates $(x_0, y_0)$ of the target with the aid of calibration values into a horizontal angle and a vertical angle relative to an optical axis of the imaging optical system.

3. A method according to claim 1, further comprising eliminating detected stray reflections from the sum functions $I_z(y)$ and $I_s(x)$.

4. A method according to claim 1, further comprising:

determining blooming of the detector from a characteristic of the sum functions $I_z(y)$ and $I_s(x)$; and changing corresponding exposure parameters therefrom.

5. A method according to claim 1, further comprising:

reading the two-dimensional image coordinates $(x_0, y_0)$ of the target formed in the preprocessing unit into an arithmetic unit.

6. A method according to claim 1, wherein the detector is optionally read out synchronously with a video clock or with a frequency matched to a respective application.

7. A method according to claim 1, wherein in the case of varying image coordinates $(x_0, y_0)$, further comprising automatically tracking a moving cooperative target with the imaging optical system and detector such that a target image does not leave an active detector surface.

8. A method according to claim 1, wherein for the purpose of 3-dimensional determination of the coordinates of the cooperative target in space, the distance to the cooperative target is additionally determined by a distance-measuring unit.

9. A method according to claim 1, wherein successively determined coordinates of a moving cooperative target are stored electronically in a memory.

10. A device for rapidly detecting the position of a cooperative target, comprising:

a theodolite;

an imaging optical system coupled to the theodolite;

a spatially resolving optoelectronic detector for receiving radiation from a cooperative target having pixels arranged in the form of a matrix; and a preprocessing unit coupled to the detector, wherein radiation intensities detected by the pixels of the detector are summed by row and column, wherein a row sum function $I_z(y)$ is formed from the sums of the rows and a column sum function $I_s(x)$ is formed from the sums of the columns, and wherein two-dimensional image coordinates $(x_0, y_0)$ of the target in the coordinate system x,y of the detector are determined from the determination of the centroid of the row sum function and column sum function.

11. A device according to claim 10, wherein the theodolite includes a radiating source for illuminating the cooperative target, the radiating source is integrated in a beam path of the imaging optical system, and wherein the radiation of the radiating source leaves the imaging optical system coaxially.

12. A device according to claim 10, further comprising a cooperative target emitting radiation.

13. A device according to claim 10, further comprising a distance-measuring unit.

14. A device according to claim 10, wherein the imaging optical system has a permanently set focus.

15. A device of claim 10, further comprising:

an external arithmetic unit, wherein only said sum functions are transmitted to said external arithmetic unit.

* * * * *